United States Patent [19]

Taylor et al.

[11] Patent Number: 4,581,386

[45] Date of Patent: * Apr. 8, 1986

[54] INTERNAL MOLD RELEASE AGENT FOR USE IN REACTION INJECTION MOLDING

[75] Inventors: Ronald P. Taylor, Coraopolis; Mark E. Cekoric, North Versailles; John E. Dewhurst, Oakdale; Saad M. Abouzahr, Coraopolis, all of Pa.

[73] Assignee: Mobay Chemical Corporation, Pittsburgh, Pa.

[*] Notice: The portion of the term of this patent subsequent to May 28, 2002 has been disclaimed.

[21] Appl. No.: 737,369

[22] Filed: May 23, 1985

[51] Int. Cl.$^4$ ............................................. C08G 18/14
[52] U.S. Cl. ........................................ 521/125; 252/17; 252/182; 264/51; 521/163; 521/167; 528/55
[58] Field of Search ..................... 521/125, 167, 163; 264/51; 252/17, 182; 528/55

[56] References Cited

U.S. PATENT DOCUMENTS

| 3,705,860 | 12/1972 | Duvall .................................. 252/358 |
| 4,067,845 | 1/1978 | Epel et al. ......................... 260/40 R |
| 4,076,695 | 4/1978 | Keil ................................ 260/77.5 AM |
| 4,119,594 | 10/1978 | Iobst et al. ...................... 260/18 TN |
| 4,218,543 | 8/1980 | Weber et al. .......................... 521/51 |
| 4,269,945 | 5/1981 | Vanderhider et al. ............. 521/159 |
| 4,374,222 | 2/1983 | Meyer ................................. 524/241 |
| 4,379,100 | 4/1983 | Salisbury et al. ..................... 264/39 |
| 4,396,729 | 8/1983 | Dominquez et al. ................. 521/51 |

FOREIGN PATENT DOCUMENTS 0119471 9/1984 European Pat. Off. .
1476997 6/1977 United Kingdom .
2101140 1/1983 United Kingdom .

Primary Examiner—Maurice J. Welsh
Attorney, Agent, or Firm—Gene Harsh; Joseph C. Gil; Thomas W. Roy

[57] ABSTRACT

The present invention is directed to a process for the production of optionally cellular, polyurethane elastomer molding by reacting a reaction mixture containing
(I) a polyisocyanate,
(II) an isocyanate-reactive polymer having a molecular weight of about 1800 to 12,000,
(III) about 5 to 50% by weight, based on the weight of component (II) of a chain extender comprising a sterically hindered aromatic diamine and
(IV) an internal mold release agent mixture comprising
  (a) about 0.5 to 10% by weight, based on the weight of components (II) and (III) of a zinc carboxylate containing 8 to 24 carbon atoms per carboxylate group and
  (b) a compatibilizer comprising a member selected from the group consisting of nitrogen-containing, isocyanate-reactive, acyclic compounds and nitrogen-containing, isocyanate-reactive polymers in an amount sufficient to solubilize the zinc carboxylate so that when the internal mold release agent mixture is in admixture with components (II) and (III), the zinc carboxylate possesses improved resistance to precipitation, the reaction mixture being processed as a one-shot system by the RIM process at an isocyanate index of about 70 to 130.

17 Claims, No Drawings

INTERNAL MOLD RELEASE AGENT FOR USE IN REACTION INJECTION MOLDING

This is a continuation of application Ser. No. 643,612 filed Aug. 23, 1984, and now U.S. Pat. No. 4,519,965.

BACKGROUND OF THE INVENTION

1. Field of the Invention

The present invention is directed to a RIM process using a molding composition which contains an internal mold release agent mixture based on a zinc carboxylate and a compatibilizer.

2. Description of the Prior Art

Reaction injection molding (RIM) has become an important process for the fabrication for external automotive body parts and other industrial thermoset moldings. The RIM process is a so-called "one-shot" process which entails the intimate mixing of a polyisocyanate component and an isocyanate-reactive component followed by the injection of this admixture into a mold for subsequent rapid curing. The polyisocyanate component is generally based on a liquid polyisocyanate. The isocyanate-reactive component contains a high molecular weight isocyanate-reactive component, usually a polyol, and optionally a chain extender containing amino or hydroxyl groups. U.S. Pat. No. 4,269,945 discloses a specific chain extender which contains an aliphatic amine-containing compound having at least one primary amino group such as an aminated polyoxypropylene glycol, and either a hydroxyl-containing compound free of aliphatic amine hydrogen atoms or an aromatic amine hydrogen-containing compound which is free of aliphatic amine. U.S. Pat. No. 4,218,543 discloses a chain extender which is miscible with the polyol component and is based on compounds containing sterically hindered amino groups such as 1-methyl-3,5-diethyl-2,4-diamino benzene, 1-methyl-3,5-diethyl-2,6-diamino benzene or mixtures thereof.

While products produced by the RIM process have excellent physical properties, the use of the RIM process has been limited by the necessity to spray external mold release agents (waxes, soaps, etc.) onto the mold surface before each shot or every several shots. Molding without such an external release agent results, using standard molding compositions, in parts that are torn, distorted or otherwise damaged because of the adhesion of the molded part to the mold surface. Several attempts have been made to formulate reaction components which contain an internal mold release agent so that the need to repeatedly apply external mold release agents to the mold surface would either be eliminated or diminished.

U.S. Pat. No. 4,379,100 is directed to the use of a polycarboxy-functional alkyl siloxane as an internal release agent; however, this internal release agent is not preblended with either the polyisocyanate or polyol component, but rather is introduced as a third stream to the mixhead of the injection apparatus. U.S. Pat. No. 4,076,695 is also directed to the use of a carboxy-functional siloxane which may be incorporated with either a polyisocyanate or polyol component as an internal mold release agent. A third patent directed to the use of carboxy-functional silanes is U.S. Pat. No. 4,396,729. However, it is disclosed therein that amino-functional reactants are necessary since polyol reactants require the use of a tin catalyst which interacts with the carboxy groups of the release agent resulting in inferior products. U.S. Pat. No. 4,374,222 is directed to the use of hydroxyl-substituted fatty acid amides as an internal mold release agent for use in the RIM process.

The use of metallic carboxylic acid salts as an internal mold release agent for various systems has also been disclosed. For example, U.S. Pat. No. 4,067,845 is directed to molded unsaturated polyester resin systems utilizing a dual thickening system based on a metallic oxide and a polyisocyanate and, in addition, a mold release agent based on zinc stearate. British Pat. No. 2,101,140 is directed to an internal mold release agent based on a metallic carboxylic salt such as zinc stearate and an epoxidized vegetable oil such as epoxidized soybean oil for use in a RIM process.

The use of zinc stearate as a catalyst is disclosed in U.S. Pat. No. 4,119,594, wherein a mixture of solid particles of hydroquinone di-(beta-hydroxyethyl)ether (as chain extender) and zinc stearate (as catalyst) are dispersed in a liquid mixture of a polyether polyol and a liquid form of diphenylmethane diisocyanate and subsequently reacted in a RIM process to produce thermoset polyurethanes.

British Pat. No. 1,476,997 discloses the use of metallic carboxylates as surface quality improvers for polyamides, while U.S. Pat. No. 3,705,860 discloses the use of metallic carboxylates as antifoam agents for paints or paper pulp compositions.

One object of the present invention is to provide RIM molding compositions which would eliminate or decrease the frequency of application of an external mold release agent to the surface of a mold, thereby, providing higher productivity. A further object of the invention is to provide such molding compositions without introducing detrimental effects on the physical properties (e.g., heat sag, flexural modulus, tear strength or tensile strength), processing characteristics (e.g., demold time, toughness at demold known as "green strength" or flowability), or post-molding operations, especially paintability.

It has been discovered that the objects of this invention can be realized by the modification of RIM molding compositions with the internal mold release agent mixtures hereinafter described.

SUMMARY OF THE INVENTION

The present invention is directed to a process for the production of optionally cellular, polyurethane elastomer moldings by reacting a reaction mixture containing
(I) a polyisocyanate,
(II) an isocyanate-reactive polymer having a molecular weight of about 1800 to 12,000,
(III) about 5 to 50% by weight, based on the weight of component (II) of a chain extender comprising a sterically hindered aromatic diamine and
(IV) an internal mold release agent mixture comprising
  (a) about 0.5 to 10% by weight, based on the weight of components (II) and (III) of a zinc carboxylate containing 8 to 24 carbon atoms per carboxylate group and
  (b) a compatibilizer comprising a member selected from the group consisting of nitrogen-containing, isocyanate-reactive, acyclic compounds and nitrogen-containing, isocyanate-reactive polymers in an amount sufficient to solubilize the zinc carboxylate so that when the internal mold release agent mixture is in admixture with components (II) and (III), the zinc carboxylate possesses improved resistance to precipitation, the reaction mixture being processed as a one-shot system by the RIM process at an isocyanate index of about 70 to 130.

The present invention is also directed to an isocyanate-reactive component for use in a RIM process based on components (II), (III) and (IV) and to an internal mold release agent mixture based on components (IV) and, optionally, (III).

DETAILED DESCRIPTION OF THE INVENTION

It has been observed that zinc carboxylates such as zinc stearate are not effective as internal release agents in conventional polyurethane RIM formulations based on polyisocyanates, high molecular weight polyols and diamine chain extenders. The reason for this ineffectiveness is not completely understood, but may be because the zinc carboxylates are neither soluble in either the polyisocyanate or isocyanate-reactive component, nor are the reaction mixtures processed at a sufficiently high temperature for the salts to melt or dissolve. The key feature of the present invention is the discovery that compositions containing both zinc carboxylates and sufficient amounts of the compatibilizers discussed hereinafter overcome the previous difficulties with regard to the use of zinc carboxylates as internal mold release agents. Apparently, these specific additives assist in dissolving or compatibilizing the zinc carboxylates in the isocyanate-reactive component and/or reaction mixture and, thus, provide effective internal release performance without significantly affecting other properties, processing characteristics or paintability. Compositions containing only one component of the internal release agent mixture are ineffective or much less effective in providing internal release performance.

Zinc Carboxylates (IVa)

The suitable zinc carboxylates which may be used in the internal release agent mixture of the present invention are based on $C_8$–$C_{24}$, branched or straight chain fatty acids which may be saturated or unsaturated. The carboxylates also include the commercial preparations of a specific carboxylate which also contains impurities or by-products of other fatty acid derivatives. For example, commercial "stearates" may also contain significant quantities of palmitates, myristates, etc. and commercial "tall oil" derivatives normally contain mixtures of stearates, palmitates, oleates, etc. Examples of specific zinc carboxylates include zinc stearate, zinc oleate, zinc octoate, zinc laurate, zinc behenate, zinc ricinoleate and the like.

The preferred zinc carboxylates are those which remain soluble in combination with the compatibilizer when in admixture with the high molecular weight isocyanate-reactive component (II) and the chain extender (III). The most preferred zinc carboxylate is zinc stearate, especially those having a high purity such as Zinc Stearate Polymer Grade Type N from Witco, Zinc Stearate RSN 131 HS and IPS from Mallinckrodt and Zinc Stearate Heat Stable Polymer Grade from Nuodex. The zinc carboxylates are used in amounts of about 0.5 to 10%, preferably about 1 to 6% and most preferably about 1 to 4%, by weight, based on the weight of components (II) and (III).

Compatibilizers (IVb)

Suitable compatibilizers are those which assist in compatibilizing or solubilizing the zinc carboxylates in the resin blend and/or in the reaction mixture without substantially affecting the processing characteristics of the reaction mixture or the physical properties or paintability of the molded articles produced therefrom. The compatibilizers include nitrogen-containing, isocyanate-reactive, acyclic compounds such as aliphatic polyamines and nitrogen-containing, isocyanate-reactive polymers, preferably polyethers. Preferred compatibilizers include polyether polyamines and amine- or hydroxyl-terminated, amine-initiated polyethers (i.e., polyethers obtained by the addition of alkylene oxides such as ethylene oxide and/or propylene oxide to aromatic or aliphatic polyamines, optionally followed by amination). Specific examples of these nitrogen-containing, isocyanate-reactive polymers include polyoxypropylene diamine (supplied as Jeffamine D-230 from Texaco), polyoxypropylene diamine (supplied as Jeffamine D-400 from Texaco), polyoxypropylene diamine (supplied as Jeffamine D-2000 from Texaco), polyoxypropylene triamine (supplied as Jeffamine T-403 from Texaco), polyoxypropylene triamine (supplied as Jeffamine T-5000 from Texaco), an ethylene diamine-based polyether polyol (supplied as Multranol 4050 from Mobay) and a toluene diamine-based polyether polyol (supplied as Multranol 9136 from Mobay).

Even though any of the previously described compounds or polymers assist in compatibilizing or solubilizing the zinc carboxylates in the resin blend and/or in the reaction mixture, it has been found that the amine- or hydroxyl-terminated, amine-based polyethers provide long term stability of the zinc carboxylates, especially zinc stearates without a gradual precipitation of the zinc stearates taking place. The amine-based polyethers provide this increased storage stability when they are used as the sole compatibilizing or solubilizing agent or when they are used in combination with the nitrogen-containing, isocyanate-reactive, acyclic compounds or, especially, the polyether polyamines.

Preferred amine-based polyethers are those initiated with an amine containing at least two nitrogens and which contain the group —N—C—C—N—, i.e. wherein there are two carbons between the nitrogens. Examples of these amines include aliphatic amines such as ethylene diamine, diethylene triamine, etc. and heterocyclic amines such as piperazine or imidazolidine. Especially preferred are the alkoxylation products, preferably ethoxylation products and more preferably the propoxylation products of ethylene diamine such as the previously described Multranol 4050.

The amount of the compatibilizer (IVb) is dependent upon many factors including, but not limited to, the molecular weight of the compatibilizer and, more specifically, the amount of nitrogen contained therein. With regard to the low molecular weight compatibilizers having molecular weights of up to about 800, the amount to be used is about 0.5 to 10.0%, preferably about 1 to 6% and most preferably about 1 to 4%, by weight, based on the weight of components (II) and (III). With regard to medium molecular weight compatibilizers having molecular weights between about 800 and 3,000, preferably between about 800 and 1,800, the amount to be used is about 2 to 30%, preferably about 4 to 20%, by weight, based on the weight of components (II) and (III).

While the use of large amounts of the compatibilizers do not have a detrimental effect on releasability, they may have detrimental effects on processing characteristics such as flow lines, density gradients and incomplete mold filling or on physical properties such as low elongation and part brittleness. These detrimental effects are more apparent when the compatibilizers are not suitable for use as the high molecular weight, isocyanate-reactive component (II), i.e. compatibilizers which do not have molecular weights of greater than about 1,800, preferably greater than about 3,000.

It is also possible to use high molecular weight compatibilizers having molecular weights greater than about 1,800, preferably greater than about 3,000. These compatibilizers are used in amounts greater than about 4%, preferably greater than about 6%, by weight, based on the weight of components (II) and (III). Since these high molecular weight compatibilizers can also be used as the high molecular weight, isocyanate-reactive component (II), they may be used to replace up to 100% of component (II) or can be used in combination with other high molecular weight, isocyanate-reactive components which do not function as compatibilizers.

Regardless of the molecular weight of the compatibilizer, it should be used in an amount which is sufficient to solubilize the zinc carboxylate so that when the internal mold release agent mixture (IV) is blended with components (II) and (III), the zinc carboxylate possesses improved resistance to precipitation.

Polyisocyanates (I)

Suitable polyisocyanates which may be used as component (I) include any of the aliphatic, cycloaliphatic, araliphatic and aromatic polyisocyanates known in polyurethane chemistry, especially those which are liquid at room temperature. Preferred are the aromatic polyisocyanates, especially those polyisocyanates which are based on 4,4'-diisocyanatodiphenylmethane (MDI) or its isomers. Suitable polyisocyanates of this type also include the polyphenyl polymethylene polyisocyanates which may be obtained by anilineformaldehyde condensation followed by phosgenation (crude MDI). Also preferred are the derivatives of MDI, its isomers or crude MDI such as polyurethane prepolymers, carbodiimides, allophanates, etc., particularly those which are liquid at room temperature, and mixtures thereof.

Particularly preferred are the liquid polyisocyanates containing urethane groups prepared from MDI, its isomers or crude MDI, but especially MDI such as those described in U.S. Pat. No. 3,644,457. These polyisocyanates containing urethane groups may be prepared by reacting one mol of MDI with from about 0.05 to 0.3 mols of low molecular weight diols or triols, preferably with polypropylene glycols having a molecular weight below 700. In addition to these mixtures of polyisocyanates and isocyanate-terminated prepolymers, the polyisocyanates (I) also include the isocyanate-terminated prepolymers known from polyurethane chemistry and disclosed in U.S. Pat. No. 4,374,210. However, the viscosity of these prepolymers should be carefully monitored since excessively high viscosities may cause processing difficulties in conventional RIM apparatus.

The polyisocyanate (I) is used in a quantity which will provide an isocyanate index for the reaction mixture of about 70 to 130, preferably about 90 to 110. The isocyanate index is the quotient of the number of isocyanate groups and the number of isocyanate-reactive groups in components (II), (III) and (IVb) multiplied by 100.

High Molecular Weight Isocyanate-Reactive Component (II)

Suitable high molecular polymers which may be used in accordance with the present invention are polyfunctional isocyanate-reactive, preferably polyhydroxy, polymers having molecular weights of from about 1800 to 12,000, preferably from about 3,000 to 7,000, and having isocyanate-reactive functionalities of from 2 to 8, preferably 2 to 4. Included among the high molecular weight isocyanate-reactive polymers are polyethers, polyesters, polythioethers, polyacetals, polycarbonates or polyester amides. Preferred are the polyethers and polyesters, and the polyethers are particularly preferred. The high molecular weight polymers preferably contain hydroxy groups, but it is also within the scope of the present invention to use polymers wherein a portion or all of the hydroxyl groups are replaced by amino groups. In this regard, polyethers wherein at least a portion of the hydroxyl groups have been converted to amino groups are especially suitable.

Suitable polyethers which may be used in accordance with the present invention are those prepared by the polymerization of epoxides, such as ethylene oxide, propylene oxide, butylene oxide, tetrahydrofuran, styrene oxide and/or epichlorohydrin, either on their own, e.g. in the presence of $BF_3$ or by a process of chemical addition of these epoxides, optionally as mixtures or successively, to starting components having isocyanate-reactive hydrogen atoms such as water, ammonia, alcohols or amines. Examples of suitable starting compounds are well known and include ethylene glycol, propylene glycol-(1,3) or -(1,2), glycerine, trimethylol propane, 4,4'-dihydroxy-diphenyl propane, aniline, ethanolamine or ethylene diamine. Polyether polyols based on propylene and/or ethylene oxide are particularly preferred according to the present invention.

If the polyether polyols are to be used directly in the molding compositions of the present invention, then it is generally preferred to use polyethers which contain predominant amounts of primary OH groups, i.e. up to about 90%, by weight, based on all of the OH groups present in the polyether. However, when filling large molds it may be necessary to use larger quantities of polyethers containing secondary OH groups to provide sufficient time to completely fill the mold before the reaction mixture gels or solidifies as taught in U.S. Pat. No. 4,379,105, herein incorporated by reference. If the hydroxyl groups of the polyether are to be converted to amino groups prior to being used in the molding compositions of the present invention, then it is preferred that the polyethers contain predominantly secondary hydroxyl groups since secondary hydroxyl groups are easier to aminate than primary hydroxyl groups.

Other polyethers which are suitable are those which have been modified with vinyl polymers, for example, by the polymerization of styrene and/or acrylonitrile in the presence of polyethers. In addition, polyether polyols which contain high molecular weight polyadducts or polycondensates in finely dispersed form or in solution may be used. Such modified polyether polyols are obtained when polyaddition reactions (e.g., reactions between the polyisocyanates and amino functional compounds) or polycondensation reactions (e.g., between formaldehyde and phenols and/or amines) are directly carried out in situ in the polyether polyols.

High molecular weight isocyanate-reactive polymers other than the polyethers are disclosed in U.S. Pat. No.

4,218,543, the entire disclosure of which is herein incorporated by reference.

Chain Extenders (III)

Suitable chain extenders are the known low molecular weight isocyanate-reactive compounds and include aromatic polyamines, especially diamines, having molecular weights of less than about 800, preferably less than about 500.

Preferred chain extenders are the sterically hindered aromatic diamines which contain at least one linear or branched alkyl substituent in the ortho-position to the first amino group and at least one, preferably two, linear or branched alkyl substituents containing from 1 to 3 carbon atoms in the ortho-position to a second amino group. These aromatic diamines include 1-methyl-3,5-diethyl-2,4-diamino benzene, 1-methyl-3,5-diethyl-2,6-diamino benzene, 1,3,5-trimethyl-2,4-diamino benzene, 1,3,5-triethyl-2,4-diamino benzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenylmethane, 3,3'-diethyl-5,5'-diisopropyl-4,4'-diamino diphenylmethane, 1-methyl-2,6-diamino-3-isopropylbenzene and mixtures of the above diamines. Most preferred are mixtures of 1-methyl-3,5-diethyl-2,4-diamino benzene and 1-methyl-3,5-diethyl-2,6-diamino benzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 2,4'- and/or 4,4'-diamino-diphenyl-methane, 1,2- and 1,4-phenylene diamine, naphthalene-1,5-diamine and triphenylmethane-4,4',4''-triamine. The difunctional and polyfunctional aromatic amine compounds may also exclusively or partly contain secondary amino groups such as 4,4'-di-(methylamino)-diphenylmethane or 1-methyl-2-methylamino-4-amino-benzene. Liquid mixtures of polyphenyl polymethylene-polyamines, of the type obtained by condensing aniline with formaldehyde, are also suitable. Generally, the nonsterically hindered aromatic diamines and polyamines are too reactive to provide sufficient processing time in a RIM system. Accordingly, these diamines and polyamines should generally be used in combination with one or more of the previously mentioned sterically hindered diamines.

The chain extender (III) is used in quantities of about 5 to 50%, preferably about 8 to 30% and most preferably about 12 to 26%, by weight, based on the weight of high molecular weight isocyanate-reactive component (II).

Other additives which may be used in the molding compositions of the present invention include catalysts, especially tin (II) salts of carboxylic acids, dialkyl tin salts of carboxylic acids, dialkyl tin mercaptides, dialkyl tin dithioesters and tertiary amines. Preferred among these catalysts are dibutyl tin dilaurate and 1,4-diazabicyclo-(2,2,2)-octane (triethylene diamine), especially mixtures of these catalysts. The catalysts are generally used in amounts of about 0.01 to 10%, preferably about 0.05 to 2.0%, based on the weight of high molecular weight isocyanate-reactive component (II).

It is also possible to use surface-active additives such as emulsifiers and foam stabilizers. Examples include N-stearyl-N',N'-bis-hydroxyethyl urea, oleyl polyoxyethylene amide, stearyl diethanol amide, isostearyl diethanol amide, polyoxyethylene glycol mono-oleate, an ester of pentaerythritol, adipic acid and oleic acid, a hydroxy ethyl imidazole derivative of oleic acid, N-stearyl propylene diamine and the sodium salts of castor oil sulfonates or of fatty acids. Alkali metal or ammonium salts of sulfonic acid, such as dodecyl benzene sulfonic acid or dinaphthyl methane disulfonic acid and also fatty acids such as ricinoleic acid or polymeric fatty acids may also be used as surface-active additives.

Suitable foam stabilizers are, for example, water-soluble polyether siloxanes. The structure of these compounds is generally such that a copolymer of ethylene oxide and propylene oxide is attached to a polydimethyl siloxane radical. Such foam stabilizers are described in U.S. Pat. No. 2,764,565.

In addition to the catalysts and surface-active agents, other additives which may be used in the molding compositions of the present invention include the known blowing agents, cell regulators, flame retardant agents, plasticizers, dyes, fillers and reinforcing agents such as glass or carbon fibers.

The compositions according to the present invention may be molded using conventional RIM processing techniques. In general, two separate streams are intimately mixed and subsequently injected into a suitable mold although it is possible to use more than two streams. The first stream contains the polyisocyanate component (I), while the second stream contains the high molecular weight isocyanate-reactive component (II), the chain extender (III), the internal mold release agent mixture (IV) and any other additive which is to be included.

In preparing the internal mold release mixture according to the present invention, it is recommended to add the solid zinc carboxylate (IVa) to the compatibilizer (IVb). It is also recommended to heat this mixture at elevated temperatures (about 80°–120° C.) with continual or occasional stirring until a clear solution is obtained. The solution may then be cooled to ambient temperature or, if necessary to maintain liquidity, kept at slightly elevated temperature until use.

In order to provide improved resistance to precipitation of the zinc carboxylate, it is preferred that the mold release mixture of component (IV) contain less than about 50% by weight of zinc carboxylate and more than about 50% by weight of the nitrogen-containing compatibilizer when present in concentrated form, i.e. prior to admixture with the high molecular weight isocyanate-reactive component. However, this limitation is not essential for providing mold release properties, but does provide increased storage stability for the mold release concentrate. The mold release concentrate may, however, contain all or a portion of the chain extender.

Prior to use, the mold release concentrate may be blended with the remainder of the isocyanate-reactive components of the second stream and agitated briefly to ensure homogeneity. If used, the reinforcing agent may be added to the resin blend at this time.

EXAMPLES

Experimental formulations were evaluated on a Cincinnati-Milacron RIMM-90 reinforced RIM machine with a Chevrolet Monte Carlo front fascia mold. Performance of experimental candidates was rated according to the ease of release from the prepared mold surface; the number of releases before part sticking, tearing or distortion; the part toughness at demold (green strength); and the flowability indicated by the presence of absence of flowlines, visible density gradients or unfilled areas of the part.

Reinforced RIM evaluations were conducted on the same machine with sufficient amounts of the desired reinforcement (Owens-Corning Fiberglas No. 737 1/32" milled glass fiber, except for Examples 45-48 which use glass flake reinforcement) dispersed in the isocyanate-reactive mixture so that the final part (once the isocyanate-reactive mixture has been combined with the proper amount of isocyanate) will contain the desired reinforcement content.

Procedure for Preparation of Internal Mold Release Agent Mixture

Eight parts of zinc stearate were added to 8 parts of polyether polyamine I in a five-gallon steel can. The can was placed in a 100° C. oven and stirred with a rod every 15 minutes. After two hours, the mixture was a clear solution which remained clear upon cooling to ambient temperature.

Procedure for Preparation of Resin Blend For Machine Evaluation

Four parts of the 1:1 solution of zinc stearate/polyether polyamine I was added to 96 parts of a resin blend of 79.3 parts of polyether polyol A, 16.5 parts of chain extender C (DETDA), 0.1 parts of tin catalyst DBTDL and 0.1 parts of amine catalyst Dabco 33LV. After 15 minutes of agitation with a mechanical stirrer a clear amber resin blend was obtained and loaded into the machine for evaluation.

Procedure for Mold Preparation

Prior to evaluating the RIM formulation, the mold surface was cleaned of possible residue by wiping with hot water until the sudsy residue disappeared. The surface was then wiped with a commercial mold cleaner (Chemtrend MC-201-B) until any visible urethane or other residues were removed. The mold surface was then again wiped with hot water and subsequently with a dry cloth. A commercial soap-type external mold release agent (e.g. Chemtrend RCTW 2006 or Frekote RIMLEASE 14) was then lightly sprayed onto all release surfaces of the mold. The release agent film was then gently buffed in by hand with a soft cloth and then the mold was again lightly sprayed with the release agent.

The mold was then ready for evaluation of the internal release formulation. The effectiveness of the formulation was judged by the ease of release, the flowability and toughness at demold, green strength, and the number of releases obtained before part removal became difficult or the parts became distorted or damaged at demold because of the adherence of the part to the mold surface.

All of the experiments set forth in the Tables were conducted using the previously described procedures.

The invention is further illustrated, but is not intended to be limited by the following examples in which all parts and percentages are by weight unless otherwise specified.

Description of Materials

Polyol A—a glycerine-initiated poly(oxyalkylene)-polyether triol having a hydroxyl number of 28 and containing about 82.5% propylene oxide and tipped with about 17.5% ethylene oxide.

Polyol B—a glycerine-initiated poly(oxyalkylene)-polyether triol having a hydroxyl number of 28 and containing about 86% propylene oxide and tipped with about 14% ethylene oxide.

Chain Extender C—a commercial preparation of diethyl toluene diamine (DETDA) which is an isomeric mixture of 1-methyl-3,5-diethyl-2,4-diamino benzene and 1-methyl-3,5-diethyl-2,6-diamino benzene in a ratio of between 65:35 and 80:20.

Crosslinker D—an amine-initiated poly(oxyalkylene)polyether tetrol having an hydroxyl number of about 630 and obtained by the addition of about 5 moles of propylene oxide to one mole of ethylene diamine.

Chain Extender E—a triethyl phenylene diamine (TEMPDA) which is predominantly (~95%) 1,3,5-triethyl-2,4-diamino benzene.

Polyisocyanate F—4,4'-diphenylmethane diisocyanate which has been liquified by reaction in a molar ratio of about 5:1 with tripropylene glycol to give a liquid product having an NCO content of about 23% and a viscosity at 25° C. of 725±175 cps.

Polyisocyanate G—a prepolymer prepared by the addition of 8 parts of a polyester derived from the reaction of oleic acid, adipic acid, and pentaerythritol (in a molar ratio of 6:1:3) to 100 parts of polyisocyanate F, the prepolymer having an NCO content of about 20.5% and a viscosity of 900±100 cps.

Polyisocyanate H—a prepolymer prepared by the addition of 8 parts of fatty surface active agent 0 to 100 parts of polyisocyanate F, the prepolymer having an NCO content of about 19.9% and a viscosity at 25° C. of about 1200±200 cps.

Tin Catalyst I—dibutyl tin dilaurate, supplied as Thermolite 12 by M & T Chemicals or as Fomrex SUL-4 by Witco.

Tin Catalyst II—dimethyl tin dilaurate, supplied as Fomrez UL-28 by Witco.

Amine Catalyst—triethylene diamine, supplied as a 33% solution in a glycol carrier, as DABCO 33LV by Air Products or as Thancat TD-33 by Texaco.

Polyether Polyamine I—an approximately 400 MW difunctional primary amine terminated polyether supplied by Texaco as Jeffamine D-400.

Polyether Polyamine J—an approximately 5000 MW trifunctional primary amine terminated polyether supplied by Texaco as Jeffamine T-5000.

Fatty Surface-Active Agent K—a commercial preparation of an N,N-diethanol amide of isostearic acid, supplied as Schercomid SI by Scher Chem Company.

Fatty Surface-Active Agent L—a commercial preparation of an N,N-diethanol amide of stearic acid, supplied as Monamid 718 by Mona Industries.

Fatty Surface-Active Agent M—a commercial preparation of an hydroxyethyl imidazoline derivative of oleic acid, supplied as Monazoline O by Mona Industries.

Fatty Surface-Active Agent N—an experimental preparation of a fatty ester obtained by condensation of ricinoleic acid with hexanediol having a hydroxyl number of 33±5 and a viscosity at 25° C. of 1250±200 cps.

Fatty Surface-Active Agent O—a polyoxyethylene glycol ester of oleic acid, supplied as PEG 200 Monooleate by Stepan Chemical.

Surfactant P—a commercial silicone surfactant supplied as L-5430 by Union Carbide.

The components used in the RIM formulations and the results of the experimental runs are set forth in the following Tables.

The following are the typical conditions for processing the unreinforced formulations on the Cincinnati-Milacron RIMM-90 for the Monte Carlo fascia. Adjustments in these conditions are required for the evaluations containing a reinforcing agent.

| | |
|---|---|
| Mixhead Type | 50/90 |
| Weight Ratio, polyisocyanate/resin blend | 49/100 |
| Injection Rate, pounds per second | 5.0 |
| Part Weight, pound | 8.1 |
| Mold Temperature, °F. | 150 |

-continued

| | |
|---|---|
| Resin Blend, specific gravity, g/cc | 0.75 |
| Material Temperature, °F. | |
| Polyisocyanate Component | 95 |
| Resin Component | 100 |
| Mix Pressures, psi | |
| Polyisocyanate Component | 1575 |
| Resin Blend Component | 1500 |
| Mold Basecoat | Soap-type external release agent |
| Demold time, seconds | 30 |

| | Example | | | | |
|---|---|---|---|---|---|
| | 1 (Comparison) | 2 (Comparison) | 3 (Comparison) | 4 (Comparison) | 5 (Comparison) |
| Polyol, parts | A, 82.1 | B, 82.1 | A, 76.1 | A, 65.0 | B, 71.7 |
| Crosslinker D | — | — | — | — | 2.0 |
| Chain Extender C | 17.7 | 17.7 | 17.7 | 16.7 | 18.0 |
| Polyamine I | — | — | — | — | — |
| Polyamine J | — | — | — | 10.0 | — |
| Tin Catalyst I | 0.1 | 0.1 | 0.1 | 0.2 | 0.2 |
| Amine Catalyst | 0.1 | 0.1 | 0.1 | 0.1 | 0.1 |
| Metallic Carboxylate, parts | — | — | — | — | — |
| Surface-active Agent, parts | — | — | N, 7.0 | N, 7.0 | K, 8.0 |
| Polyisocyanate | F | F | F | G | H |
| Green Strength @ Demold Time | Excellent @ 30 sec. | Good @ 30 sec. | Fair @ 30 sec. | Fair @ 40 sec. | Excellent @ 30 sec. |
| Number Releases | 6 | 6* | 7** | 8 | 4 |
| Flowability | Good | Good | Good | Good | Good |
| Milled Glass Fiber Reinforcement | — | — | — | — | — |

| | Example | | | | |
|---|---|---|---|---|---|
| | 6 (Comparison) | 7 (Comparison) | 8 (Comparison) | 9 (Comparison) | 10 (Comparison) |
| Polyol, parts | A, 81.8 | A, 78.7 | B, 79.0 | A, 79.3 | A, 77.25 |
| Crosslinker D | 1.0 | 1.0 | 1.0 | 2.0 | 2.0 |
| Chain Extender C | 17.0 | 18.0 | 17.8 | 16.5 | 16.5 |
| Polyamine I | — | — | — | — | — |
| Polyamine J | — | — | — | — | — |
| Tin Catalyst I | 0.1 | 0.2 | 0.1 | 0.1 | 0.15 |
| Amine Catalyst | 0.1 | 0.1 | 0.1 | 0.1 | 0.1 |
| Metallic Carboxylate, parts | — | — | — | Magnesium Ricinoleate 1.0 | Magnesium Ricinoleate 2.0 |
| Surface-active Agent, parts | — | O, 2.0 | O, 2.0 | K, 1.0 | K, 2.0 |
| Polyisocyanate | H | H | G | F | F |
| Green Strength @ Demold Time | Good @ 30 sec. | Fair @ 30 sec. | Good @ 30 sec. | Good @ 30 sec. | Fair @ 30 sec. |
| Number Releases | 5 | 11 | 2 | 4 | 3 |
| Flowability | Good | Good | Good | Good | Good |
| Milled Glass Fiber Reinforcement | — | — | — | — | — |

| | Example | | | | |
|---|---|---|---|---|---|
| | 11 | 12 | 13 | 14 | 15 |
| Polyol, parts | A, 79.1 | A, 77.3 | A, 79.4 | A, 78.1 | A, 68.1 |
| Crosslinker D | 2.0 | 2.0 | 1.0 | 1.0 | — |
| Chain Extender C | 16.5 | 16.5 | 16.7 | 16.7 | 17.7 |
| Polyamine I | — | — | — | — | — |
| Polyamine J | — | — | — | — | 10.0 |
| Tin Catalyst I | 0.1 | 0.1 | 0.1 | 0.1 | 0.1 |
| Amine Catalyst | 0.1 | 0.1 | 0.1 | 0.1 | 0.1 |
| Metallic Carboxylate, parts | Zinc Oleate 1.1 | Zinc Oleate 2.0 | Zinc Oleate 1.5 | Zinc Stearate 2.0 | Zinc Stearate 2.0 |
| Surface-active Agent, parts | K, 1.1 | K, 2.0 | K, 1.2 | K, 2.0 | K, 2.0 |
| Polyisocyanate | F | F | F | F | F |
| Green Strength @ Demold Time | Fair @ 30 sec. | Fair @ 30 sec. | Very Good @ 30 sec. | Good @ 30 sec. | Excellent @ 30 sec. |
| Number Releases | 7 | 7 | 20 | 40 | 19 |
| Flowability | Fair | Fair | Good | Good | Good |
| Milled Glass Fiber Reinforcement | — | — | — | — | — |

Example

-continued

|  | 16 | 17 | 18 | 19 | 20 |
|---|---|---|---|---|---|
| Polyol, parts | A, 72.9 | A, 52.6 | A, 77.8 | A, 78.3 | A, 75.3 |
| Crosslinker D | — | — | 1.0 | 1.0 | — |
| Chain Extender C | 15.4 | 16.7 | 17.0 | 16.5 | 16.5 |
| Polyamine I | 7.7 | — | — | — | 4.0 |
| Polyamine J | — | 22.0 | — | — | — |
| Tin Catalyst I | 0.1 | 0.1 | 0.1 | 0.1 | 0.1 |
| Amine Catalyst | 0.1 | 0.1 | 0.1 | 0.1 | 0.1 |
| Metallic Carboxylate, parts | Zinc Stearate 1.9 | Zinc Stearate 1.5 | Zinc Stearate 2.0 | Zinc Stearate 2.0 | Zinc Stearate 2.0 |
| Surface-active Agent, parts | K, 1.9 | N, 7.0 | K, 2.0 | K, 2.0 | L, 2.0 |
| Polyisocyanate | F | F | F | F | F |
| Green Strength @ Demold Time | Fair @ 40 sec. | Good @ 30 sec. | Good @ 30 sec. | Good @ 30 sec. | Fair @ 30 sec. |
| Number Releases | 25 | 45 | 20 | 28 | 60 |
| Flowability | Good | Fair; Flow Lines & Visible Dense Area | Good | Good | Fair; Sl. Flow Lines & Dense Area |
| Milled Glass Fiber Reinforcement | — | 15% | — | — | — |

|  | Example | | | | |
|---|---|---|---|---|---|
|  | 21 | 22 | 23 | 24 | 25 |
| Polyol, parts | A, 77.4 | A, 77.2 | A, 77.2 | A, 76.1 | A, 77.3 |
| Crosslinker D | — | — | — | 1.0 | — |
| Chain Extender C | 16.5 | 16.5 | 16.5 | 16.3 | 16.5 |
| Polyamine I | 2.2 | 2.0 | 2.0 | 2.0 | 2.0 |
| Polyamine J | — | — | — | — | — |
| Tin Catalyst I | 0.1 | 0.1 | 0.1 | 0.5 | 0.1 |
| Amine Catalyst | 0.1 | 0.1 | 0.1 | 0.1 | 0.1 |
| Metallic Carboxylate, parts | Zinc Stearate 2.0 | Zinc Stearate 2.0 | Zinc Stearate 2.0 | Iron Stearate 2.0 | Zinc-12-Hydroxy Stearate, 2.0 |
| Surface-active Agent, parts | L, 1.7 | L, 2.1 | K, 2.1 | K, 2.0 | K, 2.0 |
| Polyisocyanate | F | F | F | F | F |
| Green Strength @ Demold Time | Good @ 30 sec. | Fair @ 30 sec. | Good @ 30 sec. | Fair @ 30 sec. | Good @ 30 sec. |
| Number Releases | 30 | 46 | 44 | 10 | 5 |
| Flowability | Sl. Dense Area | Good | Good | Good | Sl. Dense Area |
| Milled Glass Fiber Reinforcement | — | — | — | — | — |

|  | Example | | | | |
|---|---|---|---|---|---|
|  | 26 | 27 | 28 | 29 | 30 |
| Polyol, parts | A, 77.3 | A, 77.3 | A, 75.3 | A, 75.8 | A, 77.3 |
| Crosslinker D | — | — | — | — | — |
| Chain Extender C | 16.5 | 16.5 | 16.5 | 16.0 | 16.5 |
| Polyamine I | 2.0 | 2.0 | 4.0 | 4.0 | 2.0 |
| Polyamine J | — | — | — | — | — |
| Tin Catalyst I | 0.1 | 0.1 | 0.1 | 0.1 | 0.1 |
| Amine Catalyst | 0.1 | 0.1 | 0.1 | 0.1 | 0.1 |
| Metallic Carboxylate, parts | Zinc Laurate 2.0 | Iron Stearate 2.0 | Zinc Stearate 2.0 | Zinc Stearate 2.0 | Zinc Stearate 2.0 |
| Surface-active Agent, parts | K, 2.0 | M, 2.0 | K, 2.0 | K, 2.0 | K, 2.0 |
| Polyisocyanate | F | F | F | F | F |
| Green Strength @ Demold Time | Good @ 30 sec. | Good @ 30 sec. | Good @ 30 sec. | Good @ 30 sec. | Good @ 30 sec. |
| Number Releases | 13 | 5 | 44 | 26 | 25 |
| Flowability | Good | Good | Good | Sl. Flow Lines | Good |
| Milled Glass Fiber Reinforcement | — | — | — | — | 15% |

|  | Example | | | | |
|---|---|---|---|---|---|
|  | 31 | 32 | 33 | 34 | 35 |
| Polyol, parts | B, 77.3 | B, 77.3 | A, 77.3 | A, 77.3 | A, 77.3 |
| Crosslinker D | — | — | — | — | — |
| Chain Extender C | 16.5 | 16.5 | 16.5 | 16.5 | 16.5 |
| Polyamine I | 2.0 | 2.0 | 2.0 | 2.0 | 2.0 |
| Polyamine J | — | — | — | — | — |
| Tin Catalyst I | 0.1 | 0.1 | 0.1 | 0.1 | 0.1 |
| Amine Catalyst | 0.1 | 0.1 | 0.1 | 0.1 | 0.1 |
| Metallic Carboxylate, parts | Zinc Stearate 2.0 | Zinc Stearate 2.0 | Zinc Stearate 2.0 | Zinc Stearate 2.0 | Zinc Stearate 2.0 |
| Surface-active Agent, parts | K, 2.0 | K, 2.0 | K, 2.0 | L, 2.0 | L, 2.0 |
| Polyisocyanate | F | F | F | F | F |
| Green Strength | Fair @ | Good @ | Good @ | Good @ | Very Good @ |

-continued

| | | | | | |
|---|---|---|---|---|---|
| @ Demold Time | 30 sec. | 30 sec. | 30 sec. | 30 sec. | 30 sec. |
| Number Releases | 6 | 16 | 22 | 42 | 53 |
| Flowability | Sl. Dense Area | Good | Fair; Sl. Flow Lines | Good | Good |
| Milled Glass Fiber Reinforcement | 15% | — | — | — | 15% |

| | Example | | | | |
|---|---|---|---|---|---|
| | 36 | 37 | 38 | 39 | 40 |
| Polyol, parts | A, 77.3 | A, 79.3 | B, 78.4 | A, 79.3 | A, 78.85 |
| Crosslinker D | — | — | 1.0 | — | — |
| Chain Extender C | 16.5 | 16.5 | 16.3 | 16.5 | 16.4 |
| Polyamine I | 4.0 | 2.0 | 2.0 | 2.0 | 2.0 |
| Polyamine J | — | — | — | — | — |
| Tin Catalyst I | 0.1 | 0.1 | 0.2 | 0.1 | 0.15 |
| Amine Catalyst | 0.1 | 0.1 | 0.1 | 0.1 | 0.1 |
| Metallic Carboxylate, parts | Zinc Stearate 2.0 | Zinc Stearate 2.0 | Zinc Stearate 2.0 | Zinc Stearate 2.0 | Zinc Stearate 2.0 |
| Surface-active Agent, parts | — | — | — | — | M, 0.5 |
| Polyisocyanate | F | F | F | F | F |
| Green Strength @ Demold Time | Good @ 30 sec. | Poor @ 30 sec. | V. Good @ 30 sec. | Fair @ 30 sec. | Good @ 30 sec. |
| Number Releases | 35 | 8 | 25 | 21 | 3 |
| Flowability | Good | Good | Good | Good | Fair |
| Milled Glass Fiber Reinforcement | — | — | — | 15% | 15% |

| | Example | | | |
|---|---|---|---|---|
| | 41 | 42 | 43 | 44 |
| Polyol, parts | B, 77.25 | A, 77.3 | A, 77.3 | A, 73.8 |
| Crosslinker D | 2.0 | 2.0 | 2.0 | 2.0 |
| Chain Extender C | 16.5 | 16.5 | 16.5 | 20.0 |
| Polyamine I | 2.0 | 2.0 | 2.0 | 2.0 |
| Polyamine J | — | — | — | — |
| Tin Catalyst I | 0.15 | 0.1 | 0.1 | 0.1 |
| Amine Catalyst | 0.1 | 0.1 | 0.1 | 0.1 |
| Metallic Carboxylate, parts | Zinc Stearate 2.0 | Zinc Stearate 2.0 | Zinc Stearate 2.0 | Zinc Stearate 2.0 |
| Surface-active Agent, parts | — | — | — | — |
| Polyisocyanate | F | F | F | F |
| Green Strength @ Demold Time | Good @ 30 sec. | V. Good @ 30 sec. | V. Good @ 30 sec. | Fair @ 30 sec. |
| Number Releases | 30 | 30 | 88 | 30 |
| Flowability | Good | Good | Good | Good |
| Milled Glass Fiber Reinforcement | — | 15% | — | 15% |

| | Example | | | | |
|---|---|---|---|---|---|
| | 45 | 46 | 47 | 48 | 49 |
| Polyol, parts | A, 71.8 | A, 70.8 | A, 66.8 | A, 66.8 | B, 84.3 |
| Crosslinker D | 2.0 | 3.0 | 3.0 | 1.0 | 2.0 |
| Chain Extender E | — | 23.0 | 27.0 | 27.0 | — |
| Chain Extender C | 21.0 | — | — | — | 10.5 |
| Polyamine I | 2.0 | — | — | 2.0 | 2.0 |
| Tin Catalyst I | 0.05 | 0.05 | 0.05 | 0.05 | 0.1 |
| Tin Catalyst II | 0.05 | 0.05 | 0.05 | 0.05 | — |
| Amine Catalyst | 0.1 | 0.1 | 0.1 | 0.1 | 0.1 |
| Metallic Carboxylate, parts | Zinc stearate 2.0 | Zinc stearate 2.0 | Zinc stearate 2.0 | Zinc stearate 2.0 | Zinc stearate 2.0 |
| Surfactant P | 1.0 | 1.0 | 1.0 | 1.0 | — |
| Polyisocyanate | F | F | F | F | F |
| Flowability | Good | Good | Good | Good | Good |
| Glass Flake Reinforcement % in final part | 20 | 20 | 15 | 15 | — |
| Carbon black paste*** | — | — | — | — | 4.0 |

*Average of 4 runs
**Average of 3 runs
***DR-2-205 as a dispersion in a polyether polyol from Plasticolors When Chain Extender E was used in place of Chain Extender C in Examples 46–48, the ease of release of the molded parts from the mold was unchanged from Example 45; however, the total number of releases were not determined.

In Example 49 the composition was introduced into a mold having a silicone polymer surface and containing a glass insert. When released, the molded part adhered to the glass, but not to the mold surface. The total number of releases were not determined.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of optionally cellular, polyurethane elastomer moldings by reacting a reaction mixture comprising
   (I) a polyisocyanate,
   (II) an isocyanate-reactive polymer having a molecular weight of about 1,800 to 12,000
   (III) about 5 to 50% by weight, based on the weight of component (II) of a chain-extender comprising a sterically hindered aromatic diamine and
   (IV) an internal mold release agent mixture comprising
      (a) about 0.5 to 10% by weight, based on the weight of components (II) and (III) of a zinc carboxylate containing 8 to 24 carbon atoms per carboxylate group and
      (b) a compatibilizer comprising an amine- or hydroxyl-terminated, amine-initiated polyether in an amount sufficient to solubilize the zinc carboxylate so that when the internal mold release agent mixture is in admixture with components (II) and (III), the zinc carboxylate possesses improved resistance to precipitation,
   said reaction mixture being processed as a one-shot system by the RIM process at an isocyanate index of about 70 to 130.

2. The process of claim 1 wherein said amine-initiated polyether contains the grouping —N—C—C—N—.

3. The process of claim 2 wherein said zinc carboxylate comprises zinc stearate.

4. The process of claim 2 wherein said amine-initiated polyether is an amine-initiated polyether polyol.

5. The process of claim 1 wherein said compatibilizer additionally comprises an amine-terminated polyether.

6. A process for the production of optionally cellular, polyurethane elastomer moldings by reacting a reaction mixture comprising
   (I) a polyisocyanate which is liquid at room temperature,
   (II) a polyether polyol having a molecular weight of about 3000 to 7000,
   (III) about 5 to 50% by weight, based on the weight of component (II) of a chain extender comprising a member selected from the group consisting of 1-methyl-3,5-diethyl-2,4-diamino benzene, 1-methyl-3,5-diethyl-2,6-diamino benzene, 1,3,5-triethyl-2,4-diamino benzene and
   (IV) an internal mold release agent mixture comprising
      (a) about 0.5 to 10% by weight, based on the weight of components (II) and (III) of zinc stearate and
      (b) a compatibilizer comprising an amine-initiated polyether polyol containing the grouping —N—C—C—N— in an amount of about 0.5 to 10% by weight, based on the weight of components (II) and (III), to solubilize the zinc stearate so that when the internal mold release agent mixture is in admixture with components (II) and (III), the zinc stearate possesses improved resistance to precipitation,
   said reaction mixture being processed as a one-shot system by the RIM process at an isocyanate index of about 70 to 130.

7. The process of claim 6 wherein said compatibilizer additionally comprises an amine-terminated polyether.

8. An isocyanate-reactive composition for use in a RIM process which comprises:
   (II) an isocyanate-reactive polymer having a molecular weight of about 1800 to 12,000,
   (III) about 5 to 50% by weight, based on the weight of component (II) of a chain extender comprising a sterically hindered aromatic diamine and
   (IV) an internal mold release agent mixture comprising
      (a) about 0.5 to 10% by weight, based on the weight of components (II) and (III) of a zinc carboxylate containing 8 to 24 carbon atoms per carboxylate group and
      (b) a compatibilizer comprising an amine- or hydroxyl-terminated, amine-initiated polyether in an amount sufficient to solubilize the zinc carboxylate that when the internal mold release agent mixture is in admixture with components (II) and (III), the zinc carboxylate possesses improved resistance to precipitation.

9. The process of claim 8 wherein said amine-initiated polyether contains the grouping —N—C—C—N—.

10. The isocyanate-reactive composition of claim 9 wherein said zinc carboxylate comprises zinc stearate.

11. The isocyanate-reactive composition of claim 9 wherein said amine-initiated polyether is an amine-initiated polyether polyol.

12. The isocyanate-reactive composition of claim 8 wherein said compatibilizer additionally comprises an amine-terminated polyether.

13. An internal mold release agent composition comprising
   (a) zinc stearate and
   (b) a compatibilizer comprising an amine- or hydroxyl-terminated, amine-initiated polyether polyol.

14. The internal mold release agent composition of claim 13 wherein said amine-initiated polyether contains the grouping —N—C—C—N—.

15. The internal mold release agent composition of claim 13 wherein said zinc carboxylate is present in an amount of less than 50% by weight based on the weight of components (a) and (b).

16. The internal mold release agent composition of claim 13 wherein said compatibilizer additionally comprises an amine-terminated polyether.

17. The internal mold release agent composition of claim 14 wherein said amine-initiated polyether is an amine-initiated polyether polyol.

* * * * *